(12) United States Patent
Todd et al.

(10) Patent No.: US 11,438,359 B2
(45) Date of Patent: Sep. 6, 2022

(54) INCREASING EDGE DATA CONFIDENCE VIA TRUSTED ETHICAL HACKING

(71) Applicant: EMC IP Holding Company LLC, Hopkinton, MA (US)

(72) Inventors: Stephen James Todd, Center Conway, NH (US); Jason A. Shepherd, Austin, TX (US)

(73) Assignee: EMC IP Holding Comapny LLC, Hopkinton, MA (US)

( * ) Notice: Subject to any disclaimer, the term of this patent is extended or adjusted under 35 U.S.C. 154(b) by 252 days.

(21) Appl. No.: 16/663,981

(22) Filed: Oct. 25, 2019

(65) Prior Publication Data

US 2021/0126935 A1    Apr. 29, 2021

(51) Int. Cl.
*H04L 29/06* (2006.01)
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/1466* (2013.01); *H04L 63/1475* (2013.01)

(58) Field of Classification Search
CPC ............ H04L 63/1433; H04L 63/1416; H04L 63/1475; H04L 63/1466; H04L 63/1425; H04L 63/1441; H04L 2463/144
See application file for complete search history.

(56) References Cited

U.S. PATENT DOCUMENTS 9,178,903 B1 * 11/2015 Kaplan ............... H04L 63/1433
9,800,603 B1 * 10/2017 Sidagni ............... H04L 63/1433
2017/0013008 A1 * 1/2017 Carey .................... H04L 63/20
2018/0034846 A1 * 2/2018 Marquez ............ H04L 63/1433
2020/0177613 A1 * 6/2020 Nilangekar ........ H04L 63/1433

OTHER PUBLICATIONS

Takashi Yamanoue. "A Botnet Detecting Infrastructure Using a Beneficial Botnet" SIGUCCS '18, Oct. 7-10, 2018 (8 pages) https://dl.acm.org/doi/pdf/10.1145/3235715.3235728 (Year: 2018).*

Lorenzo Franceschi-Bicchiera. "Botnets Can Be Good, Despite What the FBI Says" Published Dec. 10, 2015 (4pages) https://www.vice.com/en/article/vv7gwd/botnets-can-be-good-despite-what-the-fbi-says (Year: 2015).*

Gubler, Tyrone C. "The White-hat Bot: A Novel Botnet Defense Strategy" Jun. 2012, Theses and Dissertations, 1113 (79 pages) https://scholar.afit.edu/cgi/viewcontent.cgi?article=2116&context=etd (Year: 2012).*

"MIT Technology Review: Machine-Vision Algorithm Learns to Judge People by Their Faces", Nov. 1, 2016, Emerging Technology from the arXiv, pp. 1-7, accessed on Oct. 4, 2019 via https://www.technologyreview.com/s/602762/machine-vision-algorithm-learns-to-judge-people-by-their-faces/.

(Continued)

*Primary Examiner* — Joseph P Hirl
*Assistant Examiner* — Thomas A Gyorfi
(74) *Attorney, Agent, or Firm* — Workman Nydegger

(57) ABSTRACT

One example method includes deploying a group of bots in a computing environment that includes a group of nodes, each of the bots having an associated attack vector with respect to one or more of the nodes, receiving, from each of the bots, a report that identifies a node attacked by that bot, and a result of the attack, and adjusting, based on the bot reports, a confidence score of one or more of the attacked nodes.

20 Claims, 9 Drawing Sheets

(56) References Cited

OTHER PUBLICATIONS

Todd, "Information Playground: Edge Data and Trust Insertion", Sep. 18, 2019, pp. 1-3, accessed on Oct. 4, 2019 via https://stevetodd.typepad.com/my_weblog/2019/09/edge-data-and-trust-insertion.html.

Todd, "Information Playground: Enterprise Trust Insertion and IoT", Aug. 5, 2019, pp. 1-2, accessed on Oct. 4, 2019 via https://stevetodd.typepad.com/my_weblog/2019/08/enterprise-trust-insertion-and-iot.html.

* cited by examiner

| BOT Executable | Deployment Layer | Confidence Score Impact |
|---|---|---|
| 1.I-D | Sensor | Med |
| 2.PMID | Gateway/Server | Med |
| 3.C-L | Sensor ingest layer | High |
| 4.Stor | Gateway/Server | Low |
| 5.Net | All | High |
| 6.Ledg | Edge/Cloud | Med |

INCREASING EDGE DATA CONFIDENCE VIA TRUSTED ETHICAL HACKING

FIELD OF THE INVENTION

Embodiments of the present invention generally relate to data confidence fabrics or, more generally speaking, trust fabrics. More particularly, at least some embodiments of the invention relate to systems, hardware, software, computer-readable media, and methods for deployment of ethical hacking bots to automatically increase trust scores and edge security at scale.

BACKGROUND

Systems and methods have been devised to evaluate parameters such as the reliability, security, and trustworthiness of computing systems, networks, and associated data flows. However, as networks and the data flows scale out and become more extensive and complex, it becomes increasingly difficult to evaluate these, and other, parameters in an effective and reliable way.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 4 discloses aspects of an example bot catalog.

DETAILED DESCRIPTION OF SOME EXAMPLE EMBODIMENTS

Figure 1:
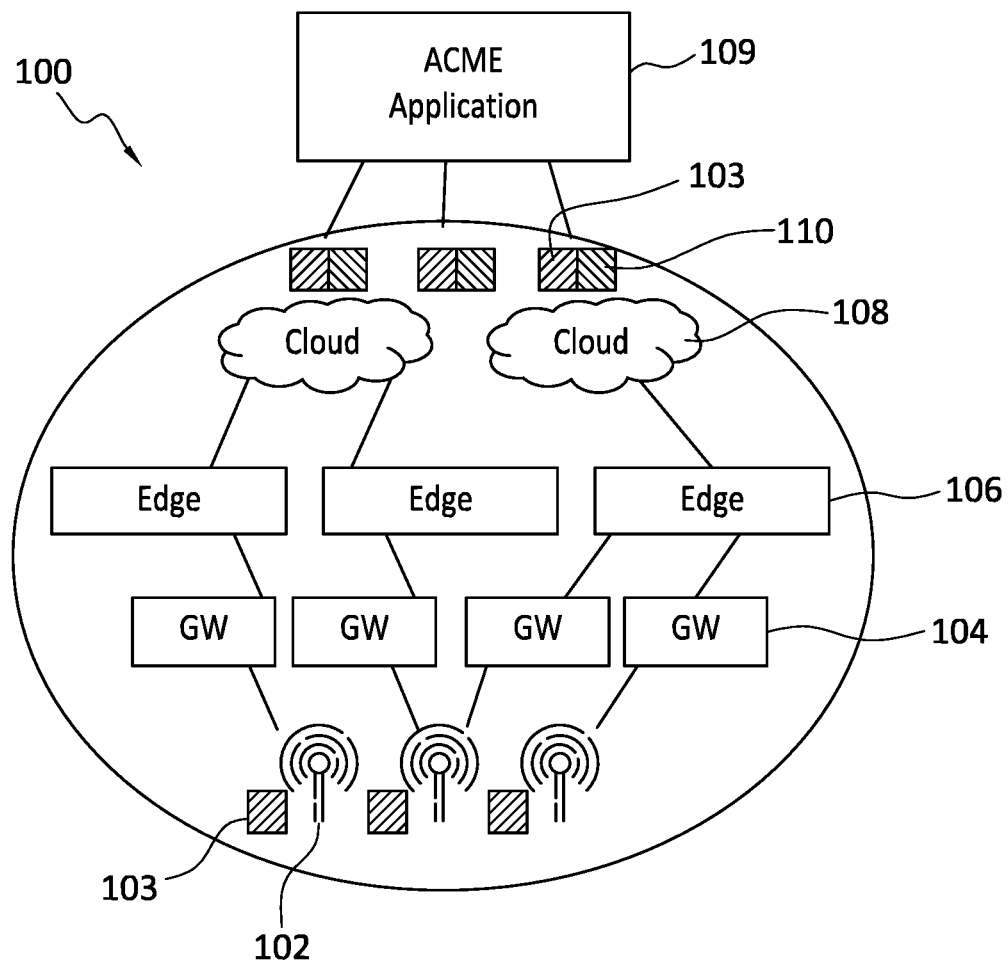
FIG. 1 discloses aspects of an example DCF.

Embodiments of the present invention generally relate to data confidence fabrics or, more generally speaking, trust fabrics. At least some embodiments of the invention relate to systems, hardware, software, computer-readable media, and methods for deployment of ethical hacking bots to automatically increase trust scores and edge security at scale. Such embodiments may be useful, for example, in connection with a data confidence fabric (DCF) that attaches trust metadata to sensor data, that is, data gathered by sensors and/or other edge devices. The trust metadata may be used as a basis to generate trust scores that measure confidence of data collected and distributed from edge devices, for example. DCFs may also aid in security by ensuring that trusted and untrusted actors are both identified and engaged with measurable confidence.

In general, example embodiments of the invention may involve the development and deployment of one or more trusted bots that are operable to probe and test various computing environments from end to end, such as a DCF environment for example. A catalogue may be maintained that keeps a record of trusted bots, and the catalogue may also include information concerning the trusted bots. The bots may be deployed in connection with a trusted DCF deployment and gathering framework, which may take the form of software that continually employs new/updated bots to search for weaknesses in the DC infrastructure, and that gathers metrics on success/failure rates of those bots. One or more of the nodes in a DCF may recognize the presence of trusted bots and the nodes may be awarded increased confidence points in the event that the nodes are able to defeat attacks implemented by the trusted bots. Finally, metrics gathered by the deployment and gathering framework may be forwarded to an entity that can "dashboard" the results, as well as issue work orders or commands to improve trust in weak/vulnerable areas of the DCF.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the use of trusted ethical hacking techniques enable ongoing, and comprehensive, evaluation of DCFs and other computing environments. An embodiment of the invention may employ trusted autonomous and/or semi-autonomous bots, such as trust insertion technology bots, that individually and/or collectively implement a trusted ethical hacking process by simulating malicious devices and actors through attacks on various nodes of a network, DCF, or any other environment. An embodiment of the invention may collect information concerning the bots, bot attacks, the nodes that were attacked, and the responses of the nodes to the attacks. An embodiment of the invention may employ bots that are able to learn, and then modify their own behavior, such as their attack vectors for example, based on information collected concerning previous attacks on nodes, and the responses of the nodes to those attacks. An embodiment of the invention may employ multiple bots, each of which performs a different respective function. In some embodiments, a group of bots may perform a coordinated attack on one or more nodes of a computing environment. An embodiment of the invention may include a deployment framework or other mechanism to deploy, control, and/or reprogram one or more bots of a group of trusted bots. An embodiment of the invention may gather reporting information from one or more bots and use that information to re-program one or more bots, to identify and repair problems in the operating environment, and to create and/or modify confidence scores of any of one or more nodes. An embodiment of the invention may correlate the response of a node to a bot attack with a confidence score, where the confidence score of infrastructure and/or data may increase or decrease depending upon the outcome of the bot attack relating to such infrastructure and/or data. An embodiment of the invention may employ a group of bots that are able to, and do, communicate with each other to perform coordinated attacks and other processes. An embodiment of the invention may involve reporting by a node that a malicious attack on the node has been detected and thwarted. An embodiment of the invention may enable a node, and/or another computing element, to adjust a trust measurement and/or confidence score associated with that node. An embodiment of the invention may evaluate bot reports, such as DCF zone reports, to determine an overall security posture of a computing environment and/or the ability of that computing environment to deliver, end-to-end in the computing environment, trusted data with relatively high confidence scores. Various other advantages of example embodiments will be apparent from this disclosure.

A. Aspects of Some Example Architectures and Operating Environments

The following is a discussion of aspects of some example operating environments for various embodiments of the invention. This discussion is not intended to limit the scope of the invention, or the applicability of the embodiments, in any way.

Devices in the operating environment may take the form of software, physical machines, virtual machines (VM), or computing elements, for example. As used herein, 'computing element' is intended to be broad in scope and embraces, among other things, any electronic device, hardware and/or other devices that include electronics of some type, software, and any combination of the foregoing. A computing element may, or may not, be configured to interact with a human user. Further, embodiments of a computing element may comprise, or consist of, hardware and/or software. As well, one or more nodes may be defined that comprise, or consist of, a computing element, or group of computing elements.

Such computing elements may include, but are not limited to, audio and/or video media recorders and players, televisions, laptop computers, tablets, autonomous and semi-autonomous aircraft such as drones, mobile phones, medical devices, smart/fitness watches, sensors of any kind including sensors that monitor physical and other parameters of an environment such as temperature for example, smart voice assistants such as the Amazon Echo and Google Home devices for example, desktop computers, global positioning system (GPS)-enabled devices of any type, autonomous devices, vehicles, and machines of any type, AR devices, VR devices, mixed reality (MR) devices, Internet of Things (IoT) devices, gateways, edge nodes, cloud storage systems, software such as applications, and any group of one or more of the foregoing. As well, computing elements may comprise, or consist of, combinations of software and the devices or systems on which the software runs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, database, row, column, or object may be used by way of example, the principles of the disclosure are not limited to any particular form of representing and storing data or other information. Rather, such principles are equally applicable to any object capable of representing information.

With particular attention now to FIG. 1, one example of at least a portion of an operating environment for embodiments of the invention is denoted generally at 100. In general, the operating environment 100 may comprise, or consist of a Data Confidence Fabric (DCF). Note that as used herein, 'DCF' embraces any combination of one or more of computing elements, nodes, applications, end users, and confidence and trust data, information, and metadata, concerning one or more users. Thus, DCF is intended to be broad in scope.

In general, data generated and/or collected by devices such as edge data devices may be forwarded from the edge data devices to one or more applications across a set of trusted nodes. The data may be transmitted together with a confidence score which, in general, reflects the confidence of the both the data being transmitted and the infrastructure transmitting it. When the data arrives at the application, the edge data may be processed by the applications with measurable confidence. In FIG. 1, a DCF implemented by the fictional ACME company is disclosed. In more detail, the example operating environment 100 may include various data generating devices 102. The data generating devices 102 may take various forms, such as sensors for example, which may or may not be IoT edge devices. In general, the data generating devices 102 may generate raw data 103, such as by collecting information concerning the operation of computing elements, mechanical devices, and/or information concerning a physical environment, for example. Note that the data generating devices 102 are not limited to data generation but may additionally, or alternatively, collect data, and/or process data, as well as transmit data to one or more other entities.

For example, the ACME company of FIG. 1 may use data generating devices 102 in the form of one or more sensors to generate raw data 103 from a manufacturing floor. As the raw data 103 flows through the DCF from the data generating devices 102, trust information may be inserted, and confidence metadata may be added at any one or more layers of the hierarchy, such as at gateways 104, edge devices and systems 106, and cloud storage sites 108. By the time an application 109, such as a corporate application for example, analyzes the raw data 103, trust metadata, confidence metadata, provenance metadata, and/or policy, metadata 110 may have been associated with the original raw data 103 as the raw data 103 transited the DCF from the data generating devices 102 to the application 109.

The confidence metadata, for example, may be accompanied by a score that allows an application, such as the application 109 for example, to understand the overall trustworthiness of the data. In the simple conceptual example of FIG. 1, where only a small number of edge devices and systems 106 are employed, it may be possible to insert trust metadata into the flow of data 103 relatively easily, and it may likewise be relatively simple to generate trust scores for the data 103 and/or edge devices and systems 106.

Figure 2:
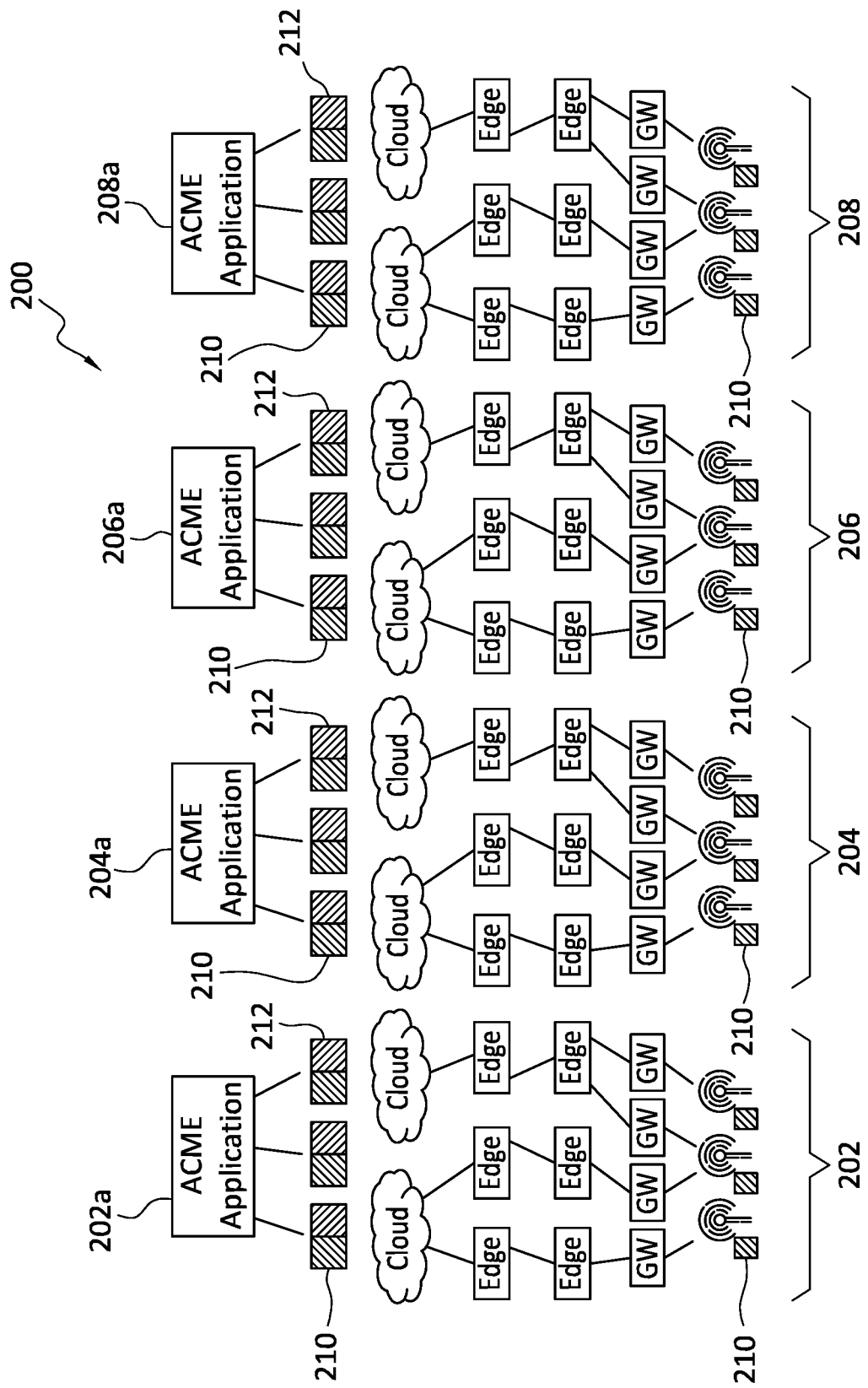
FIG. 2 discloses aspects of a large-scale DCF.

By way of introduction, and with reference now to the example of FIG. 2, a DCF 200 is disclosed that is scaled to a larger degree, relative to the simpler example of FIG. 1. Scaling may occur, for example, in a situation where multiple different manufacturing facilities are each associated with a respective DCF 202, 204, 206, and 208, and are each reporting up, through their respective DCF, into a respective set of applications 202*a*, 204*a*, 206*a*, and 208*a*. Thus, as shown in FIG. 2, there is an increased number of nodes that must insert trust metadata 210 alongside sensor data 212 as the sensor data 212 flows up to an application for processing. Managing the trust metadata 210 insertion process across many more nodes can be complex such as in an example where the arrangement disclosed in FIG. 2 represented one percent of a total DCF. It will be appreciated that the scaling up exemplified in FIG. 2 may present a challenge, insofar as there may be a continual increase in the number of trust scores generated across the entire DCF, and/or when different internal and stakeholders own each constituent DCF 202, 204, 206 and 208.

B. Example Functionalities of Embodiments in Scaled Out Environments

In contrast with the relatively simple example case of FIG. 1, discussed above, the involvement of larger and more complex operating environments may require modified and/or alternative approaches. Accordingly, as discussed herein in connection with FIGS. 2 and 3, example embodiments may provide various functionalities that take account of, and effectively deal with, circumstances that may arise from, or be implicated by, scaled up and complex operating environments. Following is a brief discussion of some aspects of embodiments of the invention that may be advantageous. As well, further details concerning such aspects may be found elsewhere herein.

For example, embodiments of the invention may provide for an automated node installation process where software and enabled hardware may be installed that can insert trust on any given node. Given the complex, distributed nature of sensor devices, the automated installation and connectivity of these nodes may help to avoid configuration problems which might otherwise occur with a manual node installation process, and which accordingly may result in trust measurements and confidence scores that are lower than corresponding trust measurements and confidence scores that may be associated with properly configured nodes. Some examples of configuration problems that may be avoided with various embodiments of the invention include a failure to enable critical hardware features, such as Trusted Platform Modul (TPM) chips for example, and erroneous configuration of software that inserts trust metadata incorrectly and/or does not adequately secure the operating environment.

Further, embodiments of the invention may provide for secure insertion of trust metadata into device data in order to protect against unauthorized and/or unauthenticated configuration changes to the node itself. This trust metadata insertion may, for example, be performed automatically and/or based on user-specified inputs. This approach enables proof that the protection against node configuration changes is correct. Accordingly, this approach may contribute to relatively higher confidence scores in the data and/or infrastructure than would be realized, for example, with manual trust metadata insertion, or with the use of default trust metadata.

Embodiments of the invention may operate in connection with large and complex environments that may include a relatively large number of ingest software platforms, both proprietary and open-source. In such environments, which may include DCFs, example embodiments may help to ensure that as the raw data from a sensor flows 'northbound' from the sensor towards an application (see, e.g., FIGS. 1 and 2), the data is handled only by client software that has undergone credential validation. That is, only entities that are both known and authorized can "see" the data as the data flows toward the application.

As another example, embodiments of the invention may increase the trustworthiness of data by helping to ensure that an identity is securely and reliably "attached" to incoming edge data, that is, data generated by a sensor or other edge device, in the early stages of the transit of that data from the device to an application or other entity. Such attachment of the identity to the data may take various forms. For example, the data may be digitally signed using a private key associated with the identity, or another similar method. By associating an identity with the data, the insertion of false data may be prevented, or at least reduced, corrupted data may be more easily detected, and/or assumption of data ownership by a malicious entity may be prevented, or at least made less likely. Thus, in cases where, for example, an embedded private key is not provided on the ingest device, the need for an administrator to have to assign appropriate identity credentials at each device installation, and associated problems such as lower data/infrastructure confidence scores, may be avoided with embodiments of the invention.

Embodiments of the invention may be beneficial in modifiable edge storage environments. For example, some edge configurations may wish to store sensor data close to the device itself. This storage may be accomplished in various ways, such as through the use of file systems, flash memory, or databases, for example. Where write-many interfaces are employed for such storage, embodiments of the invention may provide for the use of protection mechanisms associated with the data, such as an owner signature for example. This approach may, for example, help to reduce the potential for data to be modified in an undetected fashion, and the data may correspondingly be associated with a relatively higher confidence score than would be the case where no protection mechanism is employed.

In another example, embodiments of the invention provide methods and mechanisms to secure permutations of the network connections between/among devices that collect data, data ingest platforms such as gateways and servers, and other networks that are separate from the network in which the data was collected. By securing the network connections and thus preventing, for example, man-in-the-middle agents or other entities from intercepting and illegally forwarding data or otherwise snooping and capturing data without permission, embodiments of the invention may enable relatively higher confidence scores for the data/infrastructure than would be the case if the network connections were open, that is, not secure.

Embodiments of the invention may take account of the fact that edge data is inherently more valuable if it is accompanied by provenance metadata describing the source of the edge data, the nature and configuration of the ingest environment at the time the data was captured, and when the data was captured. As such, embodiments of the invention may avoid problems, such as a reduction in data and data source confidence scores, that could result where such contextual information concerning the edge data is missing.

Some embodiments of the invention may prevent spoofing of data/infrastructure confidence scores and trust metadata that are associated with edge data. Thus, such embodiments may prevent an application from being fooled into perceiving that data received by the application is trustworthy, when that data is actually not trustworthy because its confidence score and/or trust metadata have been spoofed. That is, such embodiments may provide assurance to an application or other entity that may use the data that the confidence score and/or trust metadata associated with data received by the application is legitimate. In some embodiments at least, distributed ledger technology may be employed in which a ledger entry may be validated by known peers and created by a known entity, for example, an entity with a unique private key. This approach means that DCF nodes, for example, may be configured to registered newly-created data into the correct and trusted ledger. If the newly-created data is not so registered, then the confidence in the data may be lower than in the case where registration has been implemented. Finally, embodiments of the invention may additionally, or alternatively, provide insight to an application as to whether or not data received by the application has a legitimate confidence score and/or trust metadata.

C. Aspects of Some Example Embodiments

Figure 3:
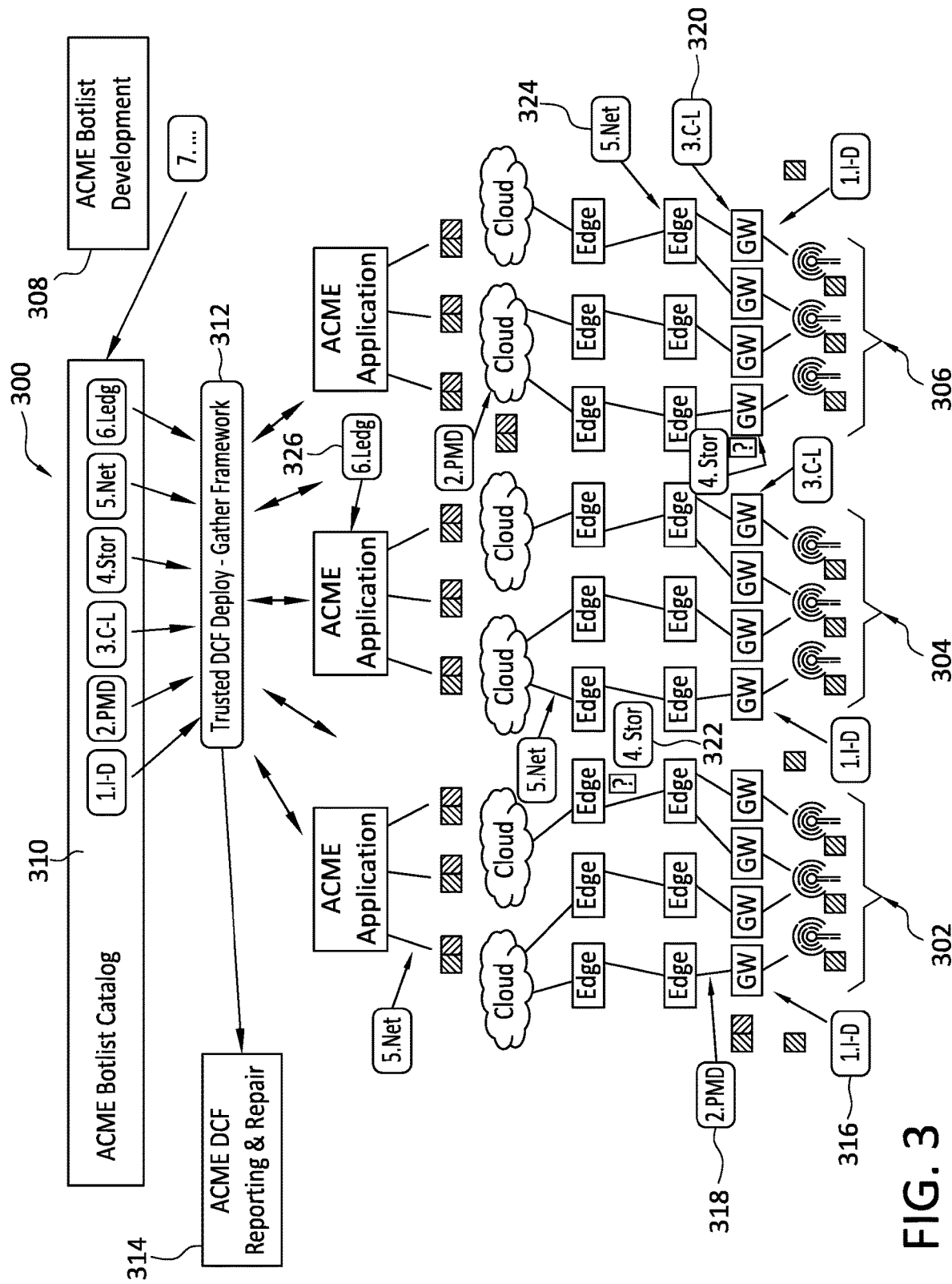
FIG. 3 discloses aspects of bot deployment in a large-scale DCF.

With reference now to FIG. 3, and continuing reference to FIGS. 1 and 2, further details are provided concerning some example embodiments of the invention. As noted elsewhere herein, example embodiments of the invention may employ "trusted ethical hacking" techniques to frequently test and probe a large, scale-out DCF to identity system-level security weaknesses and continually drive confidence scores of data and/or infrastructure higher.

To this, and/or other, ends, example embodiments may comprise various elements, although no particular element is necessarily required. One such element is trusted bot development. In general, trusted bot development involves the creation, by ethical hackers such as employees of a DCF company for example, of trusted bots that continually probe and test the DCF environment in an end-to-end fashion. Another element that may be employed in embodiments of the invention is a botlist catalog that comprises a list of trusted bots that may be continually, or not, deployed in an environment such as a DCF. Embodiments of the invention may also comprise a trusted DCF deployment and gathering framework that may take the form of software that continually employs new/updated bots to search for weaknesses in the DCF infrastructure, and gathers metrics on success/failure rates of those bots. Another element that may be employed in embodiments of the invention is a bot validation/confidence performed by DCF nodes in which each node in a DCF may recognize the presence of trusted bots and award increased confidence points for their use. As a final example, embodiments of the invention may employ a DCF reporting and repair system and process in which the metrics gathered by the deployment and gathering framework are forwarded to an entity that can "dashboard" the results as well as issue work orders or commands to improve trust in weak/vulnerable areas.

It is useful at this juncture to provide some further brief explanation concerning terms that may be employed in this disclosure. For example, as used herein, a confidence score, which may be defined for a dataset and/or for a data source, may be expressed as a numerical value, such as 7 out of 10 for example, that quantifies an extent to which an application or other end user has confidence in a particular data source and/or the data generated by or in connection with that data source. A confidence level may be based, for example, on the extent, if any, to which a node is able to withstand an attack by a trusted bot, and/or based on the nature of the attack. Various other parameters may also be used as a basis for determining a confidence score and/or the magnitude of a change in a confidence score. Thus, if an attack on a node is not particularly serious in nature, and the node successfully resisted the attack, the node that was attacked may see only a small incremental improvement in its confidence score, such as from 3 to 4. On the other hand, if an attack is serious in nature, and the node successfully repelled the attack, the node that was attacked may see only a small incremental improvement in its confidence score, such as from 3 to 8.

Similar logic may apply to the confidence scores of nodes that are unable to resist an attack. That is, a node that fails to fend off a minor attack may see a reduction in its confidence score, although the reduction may be minor since the attack was minor. Alternatively however, that node may see a significant reduction in its confidence score, since a failure to resist a minor attack may suggest that the node will be unable to resist a more serious attack. A node that fails to defeat a major attack may see a significant reduction in its confidence score.

A group confidence score may be based, for example, on respective individual confidence scores generated for one or more members of a group, such as a group of data source devices, or a group of nodes, for example. The numerical value of the confidence score may be based upon how many 'trust insertion' technologies have been applied to data originating from that data source. Various trust insertion technologies may be applied to a flow of data as the data passes from a source to a destination, such as an application for example. As disclosed herein, the flow of data may be generated as a user interacts with a computing element, for example, and the data may pass through various nodes and environments, such as one or more DCFs for example, before arriving at an application or other entity that may use the data in some way and/or may wish to interact in some way with the user who generated the data stream. The result of the application of the trust insertion technologies to the data flow is that the data flow from the particular data source thus acquires, and/or enables the calculation of, a trust measurement that is specific to that data. The various trust measurements, for each of a group of respective data streams generated in connection with respective computing elements such as edge devices for example, may then be added, or otherwise combined or processed, to generate an overall confidence score for that particular user. Depending upon the interest and need of the application or other end user of the data stream and/or of the associated trust measurements and/or confidence score, it may not be necessary to include all trust measurements when generating a confidence score. That is, only specific trust measurements that are of particular interest may be used, and any other trust measurements omitted, when the confidence score is generated. Further examples of some trust insertion technologies are disclosed in Appendix A which is a part of this disclosure and incorporated herein in its entirety by this reference.

Further, the present disclosure refers to 'bots,' and various related entities and processes. To illustrate, various example embodiments may employ one or more robots, or simply 'bots,' that comprise one or more applications, or automated scripts, that may run automated tasks involving nodes and/or other elements of the operating environments and architectures disclosed herein. Such tasks may, or may not, be performed by the bots autonomously. The tasks may, or may not, be repetitive in nature and a bot may be able to perform the task many times in a short period of time, and thus operate far beyond the capability of a human. Further aspects of some example bots are disclosed elsewhere herein.

With particular reference now to FIG. 3, one example architecture of an embodiment of the invention is denoted generally at 300. In general, the architecture 300 may comprise one or more DCFs such as the DCFs 302, 304 and 306. One or more of the DCFs 302, 304 and 306 may be similar, or identical, to one or more of the example DCFs disclosed in FIGS. 1 and 2. For example, the configuration and elements of one or more of the DCFs 302, 304 and 306 may be similar, or identical, to the configuration and elements, respectively, of one or more of the example DCFs disclosed in FIGS. 1 and 2.

As well, the architecture 300 may include systems, software, and modules for trusted bot development, such as the trusted bot development module 308. The trusted bot development (TBD) module 308 may create and/or modify one or more bots, such as the example bots 316-326 discussed below, based on user input and/or other parameters. Further, the TBD module 308 may communicate with a botlist catalog 310. In particular, the TBD module 308 may identify, to the botlist catalog 310, any new/modified bots 316-326 created by the TBD module 308. Information from the botlist catalog 310 may be provided to a deployment framework 312, such as the Trusted DCF Deploy-Gather Framework disclosed in FIG. 3, which may use the botlist catalog information 310 in the development of bot 316-326 deployment strategies, and for bot 316-326 deployment. Operations of the bots 316-326, and data gathered by the bots 316-326 such as the response of nodes to a bot attack for example, may be reported by the bots 316-326 to a DCF reporting and repair module 314. This reporting may be directly from the bots 316-326 to the DCF reporting and repair module 314, and/or indirectly from the bots 316-326 to the DCF reporting and repair module 314 by way of an intermediary such as the deployment framework 312. Following is a more detailed discussion of some of the elements of the architecture 300.

With reference first to the TBD module 308, ethical hackers and/or developers may have a "superset" list of all possible "trust insertion technologies" that could be deployed in a DCF, and these users may write software, that is, create one or more bots, that are each operable to exercise one or more specific attack vectors for any one or more of those trust insertion technologies. In FIG. 3, a number of different trust insertion technology bots, which may also be referred to herein simply as 'bots,' are disclosed. These bots, and their respective associated attack vectors, are presented only by way of example, and various other bots and their respective attack vectors may additionally or alternatively be employed in various embodiments of the invention. Moreover, the functionalities of two or more of the example bot types of FIG. 3 may, in some embodiments, be combined in a single bot type. Finally, a user may define a multi-faceted attack that comprises multiple different attack vectors, each of which is exercised by a respective bot or group of bots. Thus, a user such as an administrator may have great flexibility not only in the way in which the bots are deployed and, but also in terms of the testing that may be performed of various environments.

One bot type that may be employed in some embodiments is referred to as an I-D bot 316 which may operate to generate invalid device readings. For example, the bot 316 may simulate a rogue sensor, or other edge device or computing element, by autonomously generating invalid data that purports to, but does not actually, originate from that rogue sensor, and then trying to insert that invalid data into a DCF data flow.

Another bot type that may be employed in embodiments of the invention is a 'PMD' bot 318 which may operate to generate malicious provenance information and/or may operate to attach, or at least attempt to attach, malicious provenance information to data, such as a sensor reading for example. In this way, the bot 318 may create the appearance that particular data originated from a particular sensor for example, when in fact that data did not originate from that particular sensor, and actually originated from another source such as another sensor.

Embodiments of the invention may employ a 'C-L' bot 320 which may spoof a client or client login by attempting to tap into a data stream as a client, such as a client registering to receive events from EdgeXFoundry for example. Thus, a C-L bot 320 may be effective in testing the resistance of a node or other element to an unauthorized login and access.

Still another example bot that may be employed in embodiments of the invention is the 'Stor' bot 322. The attack vector of the bot 322 involves the storage of computing device readings, and/or readings and data from other devices. For example, the bot 322 may attempt to find device readings that have been persisted into local and/or other storage, and then alter those readings.

Embodiments of the invention may involve the use of a 'Net' bot 324. In general, the bot 324 may attempt to sniff packets or otherwise read data as the data passes northbound from a device toward an application and/or other end user.

As a final example, embodiments of the invention may employ a 'Ledg' bot 326. The bot 326 may attempt to 'join' a distributed ledger network and cast negative votes on valid entries. Additionally, or alternatively, the bot 326 may, itself, attempt to insert ledger entries into the DCF.

With regard to the aforementioned example bots, such bots may possess various characteristics and properties. For example, a bot may be 'trusted,' in the sense that when the bat employs its associated attack vector(s), the bot uses some system or method of identifying itself, such as a trusted digital signature for example. In this way, nodes in the DCF may be made aware, such as by checking the digital signature, that the attacker(s) they have detected is/are 'friendly.' As another example, one or more bots may operate autonomously, and/or may be directed in their operations.

Further, a bot may be programmed, by itself and/or one or more external entities, with respect to various attributes including, and in addition to, its specific attack vector(s). For example, a bot may be programmed: to start and end its operations at particular times; to perform its operations a specified number of times; to cooperate with one or more other bots in a coordinated multi-vector attack; to communicate with one or more other bots such as by sharing information concerning, for example, attack vectors, targets, and/or target responses to one or more particular attack vectors; to collect and report information concerning an attack and the response of the targeted nodes, and/or other elements, to the attack; to report, and/or collect information concerning, any malicious attacks, and their associated targets, observed or detected by the bot; implement, and/or supplement, one or more attack vectors of one or more other bots when one or more specified conditions are met; and, re-program itself to implement new and/or modified attack vector(s) for one or more targets based on the results of an attack and/or based on information received from one or more other bots and/or received from a deployment framework. The foregoing functions are provided only by way of example, and are not intended to limit the scope of the invention.

With continued reference now to the example architecture 300 disclosed in FIG. 3, and directing attention now to FIG. 4 as well, details are provided concerning a bot list catalog 310, another example of which is denoted generally at 400 in FIG. 4. In general, each ethical hacking bot can be placed into the bot catalog 400 of all known trusted bots. The bot catalog 400 may include metadata concerning, for example, what type of trust insertion technology may be tested with a particular bot, information about 'where' in a DCF a particular bot may be best deployed, and a scoring recommendation emphasizing the priority of this particular bot.

The bots may be stored together with the bot catalog 400, but that is not required. In general, the bots may be stored in any location from which they may be deployed to an environment, such as a DCF for example, that may be a target for testing by the bots.

In the particular illustrative example of FIG. 4, the bot list catalog 400, or simply 'bot catalog,' includes a listing 402 of trusted, executable bots, some examples of which were discussed earlier in connection with FIG. 3. As well, the bot catalog 400 may include deployment layer information 404 concerning one or more particular deployment layers where a particular bot is, or may be, deployed. Further, the bot catalog 400 may include confidence score impact information 406 that identifies, and/or quantifies in some embodiments, an extent to which the results of an attack by a particular bot may affect a confidence score of particular data and/or infrastructure.

To illustrate with an example from the bot catalog 400, an I-D bot, such as the I-D bot 316 for example, may be programmed to attack a DCF or other environment at the sensor level, such as by generating invalid readings purportedly associated with a sensor. If this attack by the I-D bot were to be successful, there may be a negative 'medium' impact on a confidence score associated with that sensor and/or its data. That is, the confidence score may be decreased below what it was before the attack and may be relatively lower than if the attack had failed. On the other hand, if the attack by the I-D bot was successfully repelled, there may be a positive 'medium' impact on a confidence score associated with that sensor and/or its data. That is, the confidence score may be increased over what it was before the attack and may be relatively higher than if the attack had succeeded.

Figure 5:
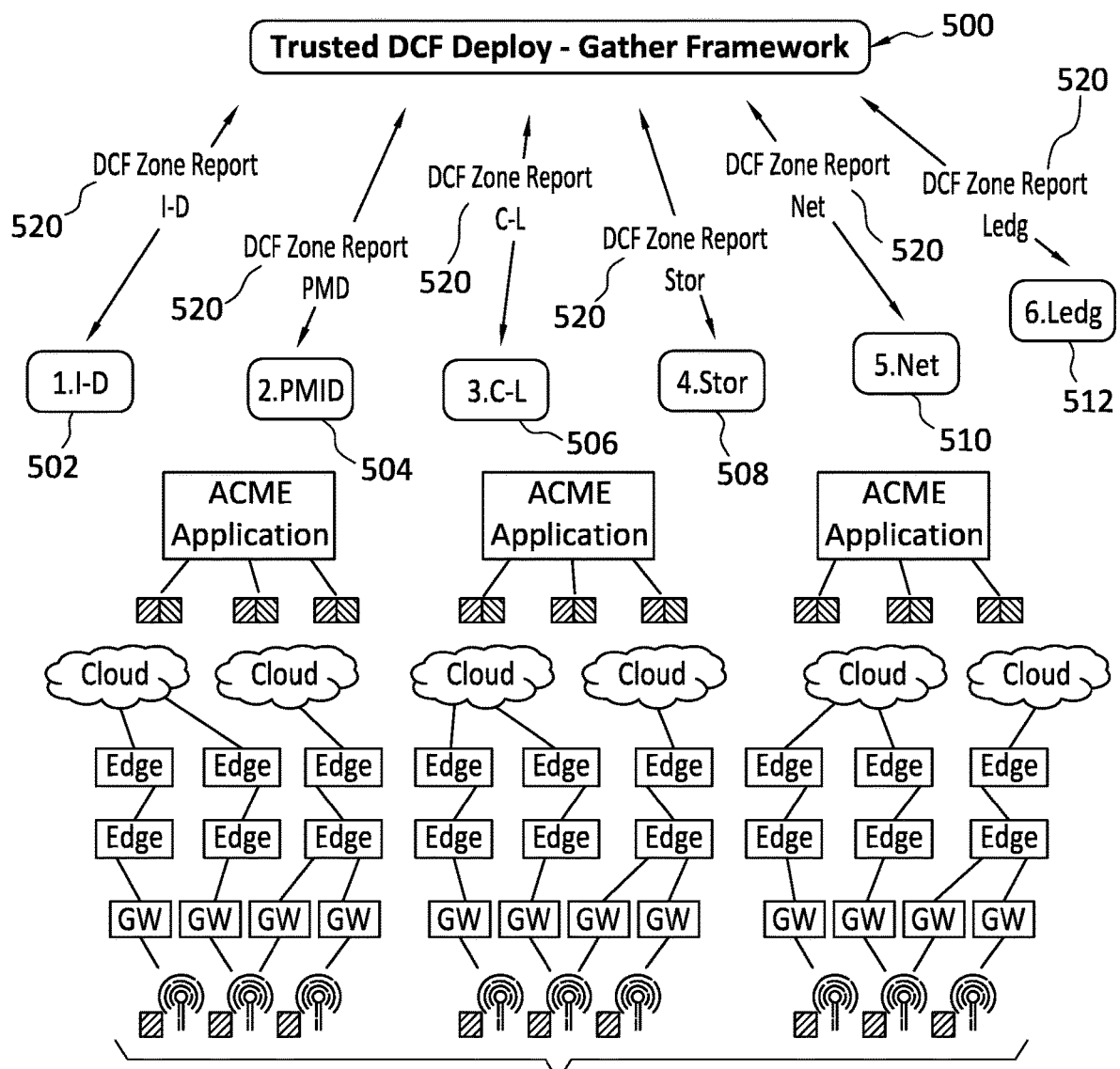
FIG. 5 discloses aspects of bot deployment and metrics gathering in a DCF.

Turning next to FIG. 5, and with continued reference to FIGS. 3 and 4, further details are provided concerning a deployment framework, one example of which is denoted at 500 in FIG. 5. Among other things, the deployment framework 500 may access the bot catalog 400 and strategically deploy some, or all, of the example bots 502, 504, 506, 508, 510, and 512, to locations where the bots may be able to test and stress a particular environment, such as a DCF 550 for example, through the user of various attack vectors, examples of which are disclosed elsewhere herein. In addition, the example bots 502, 504, 506, 508, 510, and 512, may report back to the deployment framework 500 and describe, for example, their level of success in penetrating, or not, the DCF.

In more detail, the deployment framework 500 may access the bot catalog 400, and for each bot in the catalog, such as bots 502, 504, 506, 508, 510, and 512 for example, the deployment framework 500 may deploy testing software to recommended locations throughout the DCF, and the bots 502, 504, 506, 508, 510, and 512 may then begin attacking, that is, testing and probing, their respective assigned portions of the DCF or other environment. As these portions are probed and tested, each bot 502, 504, 506, 508, 510, and 512 may experience some success and/or failures based on the trustworthiness of the nodes they are attacking. Such successes and failures may be captured by the bots 502, 504, 506, 508, 510, and 512 in reports 520, which may be referred to herein as DCF Zone reports in some embodiments, which may then be sent by the respective bots 502, 504, 506, 508, 510, and 512 back to the deployment framework 500. Thus, communication between a bot 502, 504, 506, 508, 510, and 512 and a deployment framework 500 may be two-way, with the bots 502, 504, 506, 508, 510, and 512 transmitting reports and other information to the deployment framework 500, and the deployment framework 500 transmitting deployment commands and information to the bots 502, 504, 506, 508, 510, and 512.

With continued reference to the example of FIG. 5, where groups of bots are employed to attack multiple nodes of an environment such as a DCF, the bots may be numerous and thus able to collectively perform a large number of tasks in a relatively short period of time. There is no limit to the number of bots that may included in a group. Accordingly, example groups of bots may number tens, hundreds, thousands, or tens of thousands, or more, bots.

Thus, the functions carried out by a group of bots, or even a single bot or other small number of bots, may be far beyond the capabilities of a human to perform in any way. Further, a group of bots may be able to operate in a 'swarm' mode in which the bots in the group perform one or more coordinated attacks on the various other entities disclosed herein, such as nodes for example. A swarm mode may also be useful by enabling a group of trusted bots to coordinate and cooperate with each other to defeat actual threats detected in the environment.

One or more actions of the bots in a coordinated attack may be performed autonomously, at least in part, by each respective bot and/or may be performed, at least in part, based on communication between/among multiple bots. In some embodiments, an attack may be modified while in progress, such as by the deployment framework 500, at any time by the removal and/or addition of one or more bots with the same and/or different attack vectors as the bots participating in the attack. For example, one or more bots may be trained or re-programmed to perform new and/or modified functions based on user input and/or based on data gathered by the bot in connection with an attack performed by the bot.

Figure 6:
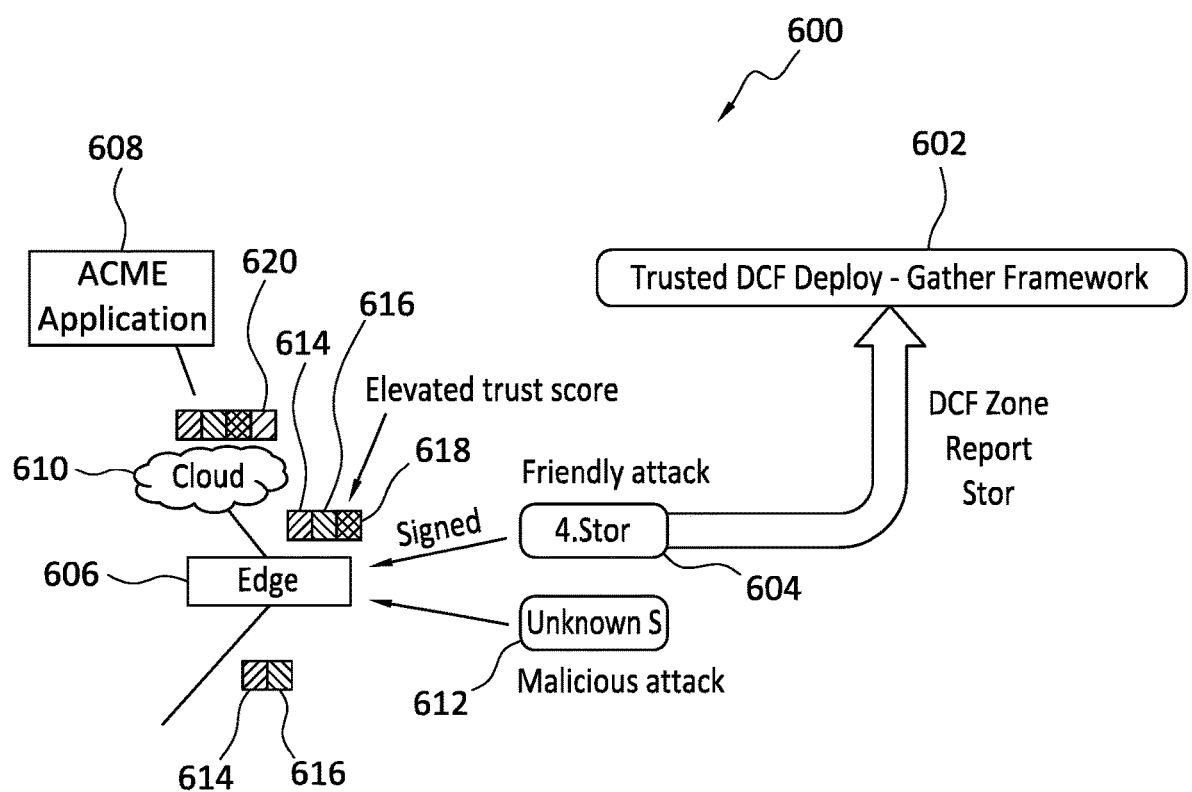
FIG. 6 discloses aspects of an attack on a node by a trusted bot.

With reference now to FIG. 6, details are provided concerning some example interactions that may involve a bot, a node, a deployment framework, and an application. Such interactions may include, for example, a 'friendly' attack on a node by a trusted bot, and a malicious attack on a node by an unknown bot or other actor. While the example of FIG. 6 involves only a single bot, a single node, and a single unknown bot, this is solely for the purposes of illustration. In fact, and as noted elsewhere herein, any number of attacks may be performed by any number of bots, with respect to any number of nodes.

In general, an example environment 600 in FIG. 6 includes a deployment framework 602 that may communicate and coordinate with a bot 604 such that the bot 604 may carry out a friendly attack on a node 606 of an environment such as a DCF. As well, the bot 604 may report the results of its attack to the deployment framework 602. The node 606 that is the target of the attack by the bot 604 may be in communication with an application 608, such as by way of a cloud 610 and/or other network elements.

Operationally, when a node such as the node 606 detects threats or attacks coming from the bot 604, the node 606 may first detect whether or not the attack is "friendly," where a friendly attack refers to an attack prosecuted by one or more of the trusted bots listed in a bot catalogue. In the particular example of FIG. 6, a trusted DCF bot 604 (4. Stor) is attempting to modify and tamper with local storage of edge data. This attack by the bot 604 may be 'signed,' meaning that the node 606, which may be a trusted edge node, may be able to identify the bot 604 as friendly. As also indicated in FIG. 6, an unknown threat 612 has been detected by the node 606 as well. In both cases, the node 606 reports, in its security posture, its success in defeating both attacks. This report by the node 606 may be transmitted to the deployment framework 602 and/or to other entities. As well, the bot 604 may report, such as to the deployment framework 602 for example, the identity of the particular zone of the environment 600 in which the attack took place, and the response of the target node(s) to that attack.

The success of the node 606 in defeating the attack by the bot 604 and the unknown threat 612 may serve to drive up a confidence score in environment infrastructure, such as the node 606 in this case, and/or a confidence score associated with data transmitted by the node to the application 608. For example, and as shown in FIG. 6, the node 606 may receive data 614 and associated trust metadata 616. As a result of the success of the node 606 in defeating the attack by the bot 604 and/or the unknown threat 612, further trust metadata 618 may be added to the data 614 and trust metadata 616. This additional trust metadata 618, which may be added by the node 606 and/or one or more other entities, may thus have the effect of improving confidence scores relating to the node 606 and data 614, as noted above. As such, when the data 614 and trust metadata 616/618 are received at the cloud 610 for example, the cloud 610 may be able to perceive a relatively high confidence score of the node 606 and/or data 614, and may thus decide that the node 606 and/or data 614 are trustworthy. This process of adding trust metadata, or removing trust metadata in other cases such as when an attack on a node or other element proves successful, may be repeated at each point along the way from the node 606 to the application 608 and/or other end user. Accordingly, and as shown in FIG. 6, the cloud 610 may add trust metadata 620 of its own, based on its success in defeating a bot attack, or real attack, for example.

As the foregoing example illustrates, embodiments of the invention may employ one or more automated bots to attack various targets, such as nodes for example. Depending upon the response of the target to the attack, a confidence score of the target and/or a confidence score of data associated with the target may increase, or decrease. Where a confidence score decreases due, for example, to the failure of a node to defeat an attack by a trusted bot or by an unknown threat, the owner or administrator of the network or other environment where the attack took place may take steps to improve security and integrity so that future such attacks by the trusted bot and/or by unknown threats may be defeated by the target that was attacked. In this way, a group of one or more autonomous bots may be employed to, ultimately, drive up confidence scores at various parts of an environment and/or throughout the environment by improving the security and integrity of the environment.

Finally, a commercial element may be employed in connection with the trusted bots. For example, if a trusted bot is determined to have performed effectively, the bot developer may be compensated accordingly. As well, the user or owner of the environment may be able to leverage an increased confidence score, such as may result from successful repulsion of a bot attack, by setting prices for provided services higher based on confidence scores.

Figure 7:
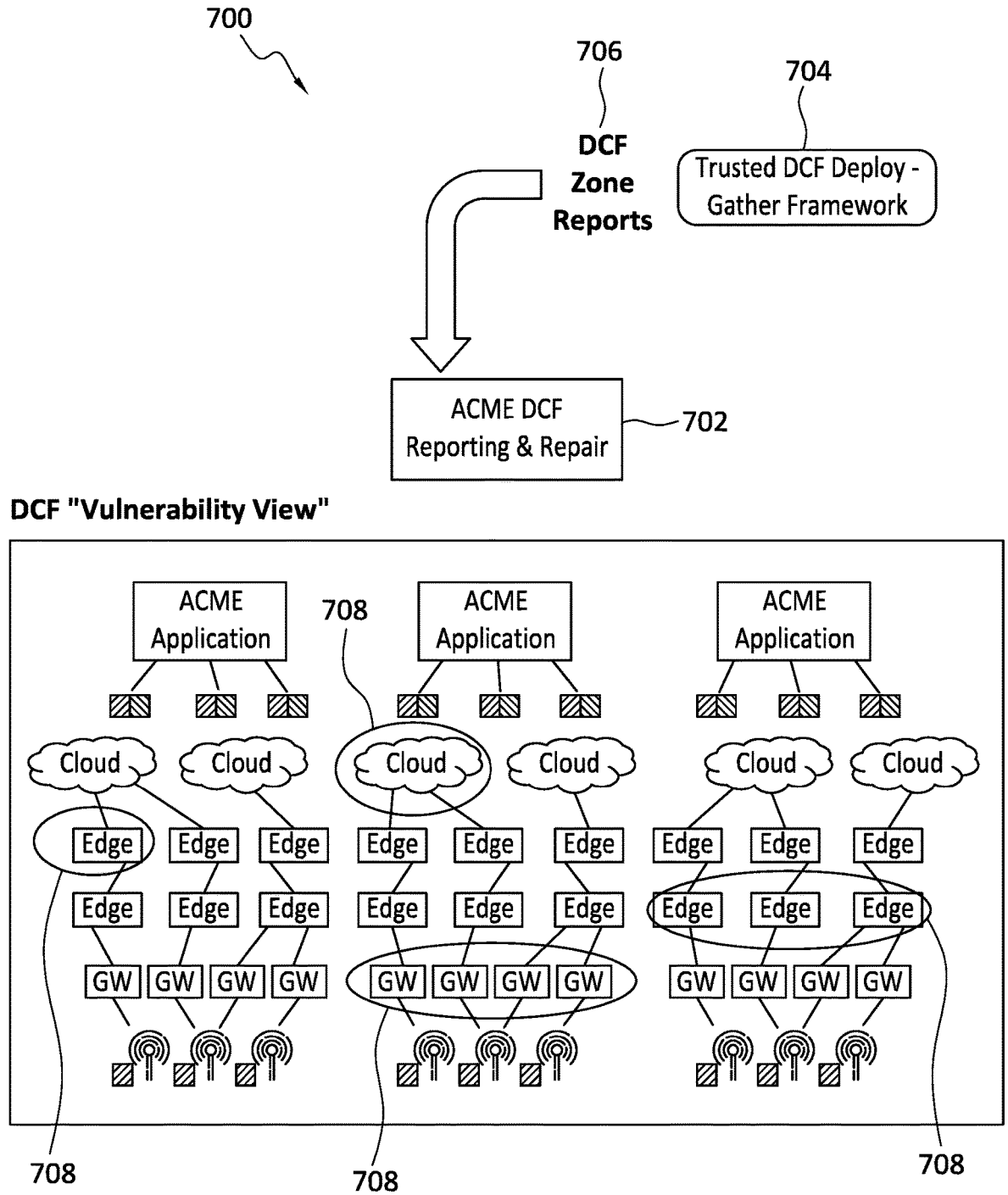
FIG. 7 discloses aspects of an environment vulnerability assessment.

As noted earlier, various remedial actions may be taken with respect to an environment after a successful attack on that environment by one or more trusted bots and/or by unfriendly actors. Turning now to FIG. 7, details are provided concerning a system 700 that may be used to evaluate, and repair, an environment such as a DCF network for example. The system 700 may include a reporting and repair module 702 that communicates with a deployment framework 704. Among other things, the deployment framework 704 may transmit bot zone reports 706 to the reporting and repair module 702. The reporting and repair module 702 may receive other information as well from the deployment framework 704 and/or other entities.

In general, the reporting and repair module 702 may, among other things, process information such as the DCF zone reports 706 and/or other information in order to understand where the strength and vulnerabilities are in the data confidence fabric, or other environment concerning which the zone reports and/or other information were generated. Such strengths and vulnerabilities may be evaluated by the reporting and repair module 702 both in terms of overall security posture of the environment, and in terms of the ability of the environment to deliver trusted data with high confidence scores, by way of trusted nodes.

As shown in FIG. 7, information such as the zone reports 706 received from one or more trusted bots may be fed by the deployment framework 704 to the reporting and repair module 702. Using the information in the zone reports 706, the reporting and repair module 702 may generate a vulnerability map that identifies, graphically in the example of FIG. 7, vulnerability zones 708 where security and trust is missing or compromised. Additionally, or alternatively, the vulnerability zones 708 may be identified in other forms, such as written form for example. In any case, the reporting and repair module 702 may then use the information concerning the vulnerability zones 708 to generate a plan to identify, and deploy, suitable remedial actions to the DCF for improving security and/or trust metadata insertion in the environment. These remedial actions may be implemented in various ways. For example, a manual service call may be made and security measures and/or trust metadata is repaired or added to a given node or nodes. Additionally, or alternatively, remedial actions may be implemented in an automated fashion by distribution of programs or other information through the environment that are operable to implement security measures and/or make changes to trust metadata.

In some embodiments, one or more repair bots may be deployed, such as by a deployment framework and/or by a reporting and repair module, for example, to automatically implement needed remedial actions in one or more nodes of an environment. Such repair bots may have access to information such as the zone reports, and the vulnerability map. As well, the repair bots may be trusted bots listed in the bot catalogue. The repair bots may also report that a remedial action or fix has been successfully implemented, or not. In some cases, the repair bots may have testing capabilities that may be used to check whether the remedial action taken was effective.

D. Example Methods

Figure 8:
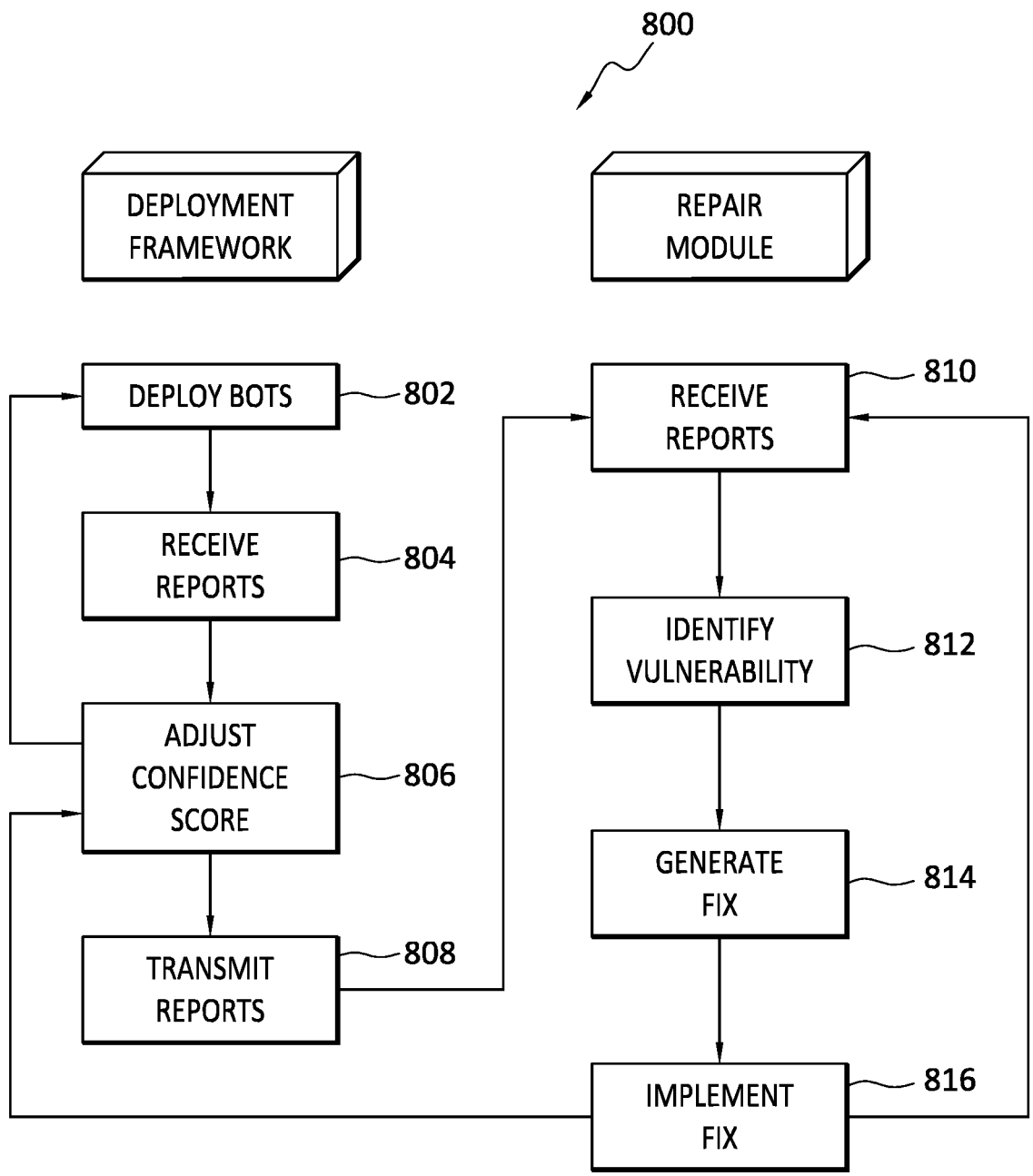
FIG. 8 discloses aspects of an example method.

With reference now to FIG. 8, details are provided concerning methods for ethical hacking of an environment, where one example method is denoted generally at 800. In the example of FIG. 8, the various processes are performed by a deployment framework and a repair module. However, the disclosed functional allocation is provided only by way of example, and in other embodiments, functions performed by one of the entities may be performed by the other entity, and/or cooperatively with the other entity. In some embodiments, the processes disclosed in FIG. 8 may be performed by a single entity, or by an entity that comprises both a deployment framework and a repair module. As well, the order of processes in FIG. 8 is presented only by way of example and, in other embodiments, the order of the processes may be different. For example, adjustment of confidence scores may be performed after transmission of reports.

The example method 800 may begin at 802 when a group of trusted bots is deployed in an environment that includes one or more nodes to be tested. In some cases, the environment may be a DCF, although that is not required and any other environment that includes one or more nodes may be tested. The trusted bots that have been deployed may then attack one or more nodes using one or more attack vectors, and the results of the attack, including the responses of the attacked nodes, may be transmitted, in the form of reports for example, by the bots and received 804 by the deployment framework.

With the information in the bot reports indicating, for example, the success and failure of various nodes, and the responses of the nodes to the attacks by the trusted bots, the deployment framework and/or other entities may then adjust confidence scores 806 of one or more of the attacked nodes and/or data associated with those nodes. In some embodiments, the method may return to the bot deployment stage 802 and begin again. At the same, or another, time, the deployment framework may transmit 808 one or more of the bot reports to a repair module which receives 810 the bot reports.

Using the information in the bot reports, the repair module may then identify one or more vulnerabilities 812 in the tested environment. In some embodiments, specific nodes, associated attacks on those nodes, trusted bots that carried out the attacks, and observed vulnerabilities of the nodes, may be identified, with information contained in the bot reports. Identification of vulnerabilities 812 may include generation of a vulnerability map that identifies, graphically in some embodiments, areas of concern in the tested environment.

When the vulnerabilities have been identified 812, remedial actions or fixes may be identified and generated 814 that may be used to remedy the vulnerabilities. The remedial actions, which may take a wide variety of forms, such as software patches for example, may then be implemented 816 in the vulnerable nodes. As part of this implementation 816, the updated devices and/or other network elements may then be tested to verify that the identified vulnerability has been eliminated.

Implementation of the fixes may then serve as a basis for adjustment of confidence scores 806 of the updated devices. In general, it may be expected that a device that has been updated to eliminate a vulnerability may realize an increase in its confidence score. As noted elsewhere herein, the extent to which the confidence score is modified may be based on the nature of the vulnerability that was eliminated.

E. Further Example Embodiments

Following are some further example embodiments of the invention. These are presented only by way of example and are not intended to limit the scope of the invention in any way.

Embodiment 1. A method, comprising: deploying a group of bots in a computing environment that includes a plurality of nodes, each of the bots having an associated attack vector with respect to one or more of the nodes; receiving, from each of the bots, a report that identifies a node attacked by that bot, and a result of the attack; and adjusting, based on the bot reports, a confidence score of one or more of the attacked nodes.

Embodiment 2. The method as recited in embodiment 1, wherein the deployed bots are recognized as trustworthy by the nodes.

Embodiment 3. The method as recited in any of embodiments 1-2, wherein a confidence score of a first node is increased as a result of the first node having successfully resisted an attack by one of the bots, and a confidence score of a second node is decreased as a result of the second node having unsuccessfully resisted an attack by one of the bots.

Embodiment 4. The method as recited in in any of embodiments 1-3, wherein each of the attack vectors is specific to a particular layer of the computing environment.

Embodiment 5. The method as recited in any of embodiments 1-4, wherein the nodes comprise any one or more of a sensor, gateway/server, sensor ingest layer, or edge/cloud.

Embodiment 6. The method as recited in any of embodiments 1-5, wherein the attack vectors target any one or more of node readings, data provenance metadata, client logins, storage of node readings, packets, and a distributed ledger network.

Embodiment 7. The method as recited in any of embodiments 1-6, wherein a subset of the bots cooperate with each other to perform a coordinated attack of the computing environment.

Embodiment 8. The method as recited in any of embodiments 1-7, wherein one or more of the bots operate autonomously.

Embodiment 9. The method as recited in any of embodiments 1-8, further comprising: identifying, based on one or more bot reports, a vulnerability in the computing environment; identifying a remedial action for the vulnerability; and implementing the remedial action in a node.

Embodiment 10. The method as recited in embodiment 9, further comprising updating a confidence score of the node based upon implementation of the remedial action.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
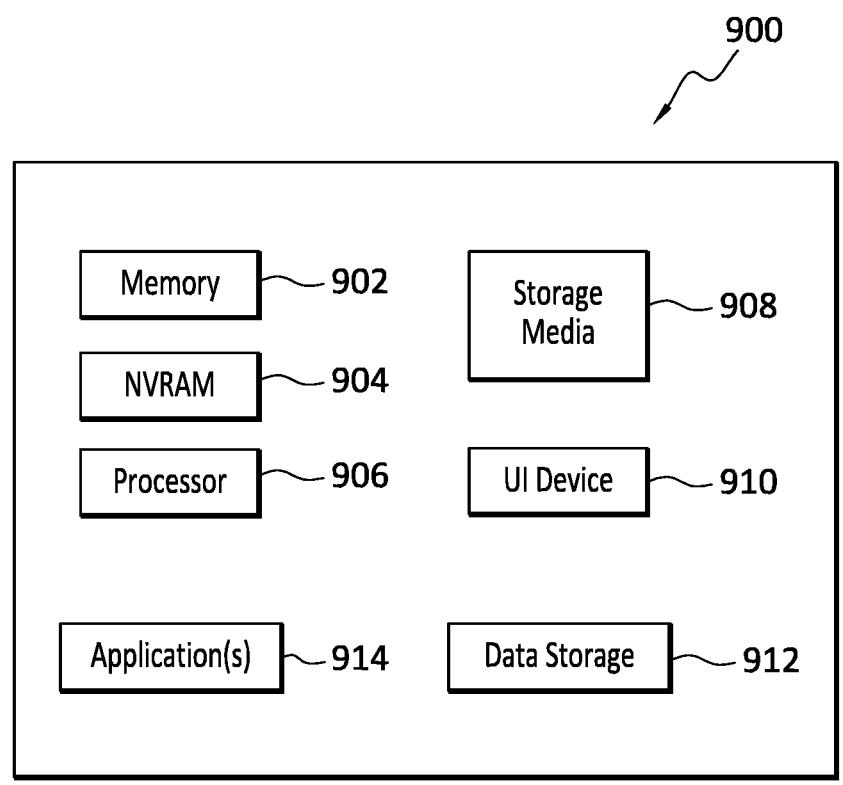
FIG. 9 discloses aspects of an example host device.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIGS. 1-8.

In the example of FIG. 9, the physical computing device 900 includes a memory 902 which may include one, some, or all, of random access memory (RAM), non-volatile random access memory (NVRAM) 904, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
deploying a group of bots in a computing environment that includes a plurality of nodes, each of the bots operable to exercise a respective attack vector with respect to one or more of the nodes, and one of the attack vectors is executable to employ a passive approach that does not involve installation of software on the nodes;
receiving, from each of the bots, a report that identifies a node attacked by that bot, and a result of the attack; and
adjusting, based on the reports received from the bots, a confidence score of one or more of the attacked nodes.

2. The method as recited in claim 1, wherein the deployed bots are recognized as trustworthy by the nodes.

3. The method as recited in claim 1, wherein a confidence score of a first node is increased as a result of the first node having successfully resisted an attack by one of the bots, and/or a confidence score of a second node is decreased as a result of the second node having unsuccessfully resisted an attack by one of the bots.

4. The method as recited in claim 1, wherein each of the attack vectors is specific to a particular layer of the computing environment.

5. The method as recited in claim 1, wherein the nodes comprise any one or more of a sensor, gateway/server, sensor ingest layer, or edge/cloud.

6. The method as recited in claim 1, wherein the attack vectors target any one or more of node readings, data provenance metadata, client logins, storage of node readings, packets, and a distributed ledger network.

7. The method as recited in claim 1, wherein a subset of the bots cooperate with each other to perform a coordinated attack of the computing environment.

8. The method as recited in claim 1, wherein one or more of the bots operate autonomously.

9. The method as recited in claim 1, further comprising:
identifying, based on one or more bot reports, a vulnerability in the computing environment;
identifying a remedial action for the vulnerability; and
implementing the remedial action in a node.

10. The method as recited in claim 9, further comprising updating a confidence score of the node based upon implementation of the remedial action.

11. A non-transitory storage medium having stored therein instructions that are executable by one or more hardware processors to perform operations comprising:

deploying a group of bots in a computing environment that includes a plurality of nodes, each of the bots operable to exercise a respective attack vector with respect to one or more of the nodes, and one of the attack vectors is executable to employ a passive approach that does not involve installation of software on the nodes;

receiving, from each of the bots, a report that identifies a node attacked by that bot, and a result of the attack; and adjusting, based on the reports received from the bots, a confidence score of one or more of the attacked nodes.

12. The non-transitory storage medium as recited in claim 11, wherein the deployed bots are recognized as trustworthy by the nodes.

13. The non-transitory storage medium as recited in claim 11, wherein a confidence score of a first node and/or data associated with the first node is increased as a result of the first node having successfully resisted an attack by one of the bots, and/or a confidence score of a second node and/or data associated with the second node is decreased as a result of the second node having unsuccessfully resisted an attack by one of the bots.

14. The non-transitory storage medium as recited in claim 11, wherein each of the attack vectors is specific to a particular layer of the computing environment.

15. The non-transitory storage medium as recited in claim 11, wherein the nodes comprise any one or more of a sensor, gateway/server, sensor ingest layer, or edge/cloud.

16. The non-transitory storage medium as recited in claim 11, wherein the attack vectors target any one or more of node readings, data provenance metadata, client logins, storage of node readings, packets, and a distributed ledger network.

17. The non-transitory storage medium as recited in claim 11, wherein a subset of the bots cooperate with each other to perform a coordinated attack of the computing environment.

18. The non-transitory storage medium as recited in claim 11, wherein one or more of the bots operate autonomously.

19. The non-transitory storage medium as recited in claim 11, wherein the operations further comprise:

identifying, based on one or more bot reports, a vulnerability in the computing environment;

identifying a remedial action for the vulnerability; and implementing the remedial action in a node.

20. The non-transitory storage medium as recited in claim 19, wherein the operations further comprise updating a confidence score of the node based upon implementation of the remedial action.

* * * * *